United States Patent
Liu et al.

(10) Patent No.: US 7,361,380 B1
(45) Date of Patent: Apr. 22, 2008

(54) PROCESS FOR IMPROVING CORROSION RESISTANCE OF THIN-FILM RECORDING MEDIA & MEDIA OBTAINED THEREBY

(75) Inventors: Jianwei Liu, Fremont, CA (US); Michael Joseph Stirniman, Fremont, CA (US); Kueir Weei Chour, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 777 days.

(21) Appl. No.: 10/358,164

(22) Filed: Feb. 5, 2003

Related U.S. Application Data

(60) Provisional application No. 60/423,145, filed on Oct. 31, 2002.

(51) Int. Cl.
*B05D 3/02* (2006.01)
*B05D 3/12* (2006.01)

(52) U.S. Cl. .............. 427/131; 427/350; 427/430.1; 427/255.6

(58) Field of Classification Search ........... 427/128, 427/130, 131, 294, 350, 377, 407.1, 430.1, 427/255.6
See application file for complete search history.

(56) References Cited

U.S. PATENT DOCUMENTS

| | | | |
|---|---|---|---|
| 5,049,410 A * | 9/1991 | Johary et al. ............ 427/131 |
| 5,331,487 A * | 7/1994 | Gregory et al. ......... 360/97.02 |
| 5,545,478 A * | 8/1996 | Lin et al. .................. 428/332 |
| 6,183,831 B1 | 2/2001 | Hughes et al. |
| 6,355,300 B1 | 3/2002 | Stirniman et al. |
| 6,613,151 B1 * | 9/2003 | Stirniman et al. ......... 118/726 |
| 6,808,741 B1 * | 10/2004 | McLeod .................. 427/131 |

* cited by examiner

*Primary Examiner*—William Phillip Fletcher, III
(74) *Attorney, Agent, or Firm*—McDermott Will & Emery LLP

(57) ABSTRACT

A method for increasing the corrosion resistance of a data/information storage and retrieval medium comprises sequential steps of:
(a) providing a thin film data/information storage retrieval medium comprising, in overlying sequence:
 (i) a non-magnetic substrate;
 (ii) a layer stack including at least one magnetic layer; and
 (iii) a protective overcoat layer comprising a plurality of pores and/or channels extending therethrough;
(b) maintaining the medium at an elevated temperature in a reduced pressure environment for an interval sufficient to remove moisture contained in the pores and/or channels of the protective overcoat layer; and
(c) filling the pores and/or channels of said protective overcoat layer with a hydrophobic material.

12 Claims, 1 Drawing Sheet

PROCESS FOR IMPROVING CORROSION RESISTANCE OF THIN-FILM RECORDING MEDIA & MEDIA OBTAINED THEREBY

CROSS-REFERENCE TO PROVISIONAL APPLICATION

This application claims priority from U.S. provisional patent application Ser. No. 60/423,145 filed Oct. 31, 2002, the entire disclosure of which is incorporated herein by reference.

FIELD OF THE INVENTION

The present invention relates to an improved method for increasing or enhancing the corrosion resistance of thin film magnetic and/or magneto-optical (MO) data/information storage and retrieval media, e.g., hard disks, when the media includes an ultra-thin protective overcoat layer for facilitating use in disk drives utilizing Contact Start/Stop ("CSS") operation with flying head read/write transducers operating at very low flying heights, and to media with improved corrosion resistance obtained thereby.

BACKGROUND OF THE INVENTION

Magnetic and MO media are widely employed in various applications, particularly in the computer industry for data/information storage and retrieval purposes. A magnetic medium in, e.g., disk form, such as utilized in computer-related applications, comprises a non-magnetic disk-shaped substrate, e.g., of glass, ceramic, glass-ceramic composite, polymer, metal, or metal alloy, typically an aluminum (Al)-based alloy such as aluminum-magnesium (Al—Mg), having at least one major surface on which a layer stack or laminate comprising a plurality of thin film layers constituting the medium are sequentially deposited. Such layers may include, in sequence from the substrate deposition surface, a plating layer, e.g., of amorphous nickel-phosphorus (Ni—P), a polycrystalline underlayer, typically of chromium (Cr) or a Cr-based alloy such as chromium-vanadium (Cr—V), a magnetic layer, e.g., of a cobalt (Co)-based alloy, and a protective overcoat layer, typically of a carbon (C)-based material, e.g., diamond-like carbon ("DLC") having good tribological properties. A similar situation exists with MO media, wherein a layer stack or laminate is formed on a substrate deposition surface, which layer stack or laminate typically comprises a reflective layer, e.g., of a metal or metal alloy, one or more rare-earth thermo-magnetic (RE-TM) alloy layers, one or more transparent dielectric layers, and a protective overcoat layer, e.g., a DLC layer, for functioning as reflective, transparent, writing, writing assist, and read-out layers, etc.

Thin film magnetic and MO media in disk form, such as described supra, are typically lubricated with a thin topcoat film or layer comprised of a polymeric lubricant, e.g., a perfluoropolyether, to reduce wear of the disc when utilized with data/information recording and read-out transducer heads operating at low flying heights, as in a hard disk system functioning in a contact Start/Stop ("CSS") mode. Conventionally, the thin film of lubricant is applied to the disc surface(s) during manufacture by dipping into a bath containing a small amount of lubricant, e.g., less than about 1% by weight of a fluorine-containing polymer, dissolved in a suitable solvent, typically a perfluorocarbon, fluorohydrocarbon, or hydrofluoroether.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") cycle commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

For optimum consistency and predictability, it is necessary to maintain each transducer head as close to its associated recording surface as possible, i.e., in order to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

The lubricity properties of disk-shaped recording media are generally measured and characterized in terms of dynamic and/or static coefficients of friction. The former type, i.e., dynamic friction coefficient, is typically measured utilizing a standard drag test in which the drag produced by contact of a read/write transducer head with a disk surface is determined at a constant spin rate, e.g., 1 rpm. The latter type, i.e., static coefficients of friction (also known as "stiction" values), are typically measured utilizing a standard contact start/stop ("CSS") test in which the peak level of friction is measured as the disk starts rotating from zero (0) rpm to a selected revolution rate, e.g., 7,200 rpm. After the peak friction has been measured, the disk is brought to rest, and the start/stop process is repeated for a selected number of start/stop cycles. An important property of a disk which is required for good long-term disk and drive performance is that the disk retain a relatively low coefficient of friction after many start/stop cycles or contacts with the read/write transducer head, e.g., 20,000 start/stop cycles.

According to conventional practices, a lubricant topcoat is uniformly applied over the protective overcoat layer to prevent wear between the disk and the facing surface of the read/write transducer head during CSS operation because excessive wear of the protective overcoat layer increases friction between the transducer head and the disk, eventually leading to catastrophic failure of the disk drive. However, an excess amount of lubricant at the head-disk interface causes high stiction between the head and the disk, which stiction, if excessive, prevents starting of disk rotation, hence catastrophic failure of the disk drive. Accordingly, the lubricant thickness must be optimized for stiction and friction.

The continuing requirements for increased recording density and faster data transfer rates necessitating lower flying heights of the data transducing heads and friction/stiction of the head-disk interface have served as an impetus for the development of improved protective overcoat layers, typically carbon (C)-based, and improved lubricant topcoat layers, typically perfluoropolyether-based, which provide enhanced performance, including improved tribological performance and corrosion resistance, when utilized in ultra-thin thicknesses, e.g., ~10-25 Å for the protective overcoat layer and ~10-16 Å for the lubricant topcoat layer.

The performance of hard disks, however, is very heavily dependent upon the corrosion resistance of the media. In this regard, it is well known that the presence of moisture, e.g., water in vapor or liquid form, at or near the magnetic layer(s) of the media is a primary cause of media corrosion in typical disk drive operating environments. A major function, therefore, of the protective overcoat layer in preventing corrosion of the media, is to block moisture (e.g., water in vapor or liquid form) from contact with the magnetic layer(s). However, as the thickness of the carbon-based protective overcoat and lubricant topcoat layers are progressively reduced in order to facilitate operation with data transducing heads operating at very low flying heights, prevention of moisture passage or diffusion through the protecting layers to the underlying magnetic layer(s) becomes an increasingly challenging task, primarily due to the discontinuous nature of the ultra-thin protective overcoat layer, i.e., wherein the protective overcoat layer comprises a plurality of pores and/or channels extending to the magnetic layer(s).

In view of the foregoing, there exists a clear need for improved methodology and means for eliminating, or at least substantially minimizing, corrosion of thin film magnetic and/or MO recording media comprising ultra-thin protective overcoat and lubricant topcoat layers. Specifically, there exist a need for improved methodology and means for effectively preventing contact of magnetic layers of thin film recording media with moisture penetrating through ultra-thin protective overcoat and lubricant topcoat layers, which methodology and means are simple, cost-effective, and fully compatible with the productivity requirements of automated manufacturing technology.

The present invention fully addresses and solves the above-described corrosion-associated problems attendant upon the formation of thin film magnetic and/or magneto-optical (MO) high areal density recording media comprising ultra-thin protective overcoat and lubricant topcoat layers, such as are employed in disk drive systems utilizing heads/data transducers operating at very low flying heights, while maintaining full compatibility with all mechanical and electrical aspects of conventional disk technology. In addition, the present invention enjoys utility in preventing corrosion of a wide variety of substrates, laminates, devices, etc. comprising ultra-thin protective overcoat layers.

DISCLOSURE OF THE INVENTION

An advantage of the present invention is an improved method for increasing the corrosion resistance of a data/information storage and retrieval medium.

Another advantage of the present invention is an improved thin film data/information storage and retrieval medium with enhanced corrosion resistance.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method for increasing the corrosion resistance of a data/information storage and retrieval medium, comprising sequential steps of:

(a) providing a thin film data/information storage retrieval medium comprising, in overlying sequence:
    (i) a non-magnetic substrate;
    (ii) a layer stack including at least one magnetic layer; and
    (iii) a protective overcoat layer comprising a plurality of pores and/or channels extending therethrough;

(b) maintaining the medium at an elevated temperature in a reduced pressure environment for an interval sufficient to remove moisture contained in the pores and/or channels of the protective overcoat layer; and (c) filling the pores and/or channels of the protective overcoat layer with a hydrophobic material.

According to embodiments of the present invention, step (b) comprises heating the medium at a temperature and for an interval sufficient to remove water and/or water vapor from the pores and/or channels; step (c) comprises exposing the protective overcoat layer to a vapor of the hydrophobic material; and the method further comprises a step (d) of applying a lubricant topcoat layer over the protective overcoat layer, e.g., by means of a dipping process.

Preferred embodiments of the present invention include those wherein step (a) comprises providing a thin film data/information storage medium with an ultra-thin protective overcoat layer (iii) having a thickness from about 10 to about 25 Å, e.g., a carbon (C)-based layer; step (b) comprises heating the medium in an about 25 mTorr environment for about 30 min. at a temperature from about 60 to about 160° C. to remove water and/or water vapor from the pores or channels; step (c) comprises exposing the protective overcoat layer to a vapor of a lubricant material, e.g., a vapor of a low molecular weight perfluoropolyether compound; and the method further comprises a step (d) of applying a lubricant topcoat layer over the protective overcoat layer; and step (d) comprises dipping the medium in a liquid solution comprising a perfluoropolyether compound.

Another aspect of the present invention is a thin film data/information storage retrieval medium, comprising:
(a) a non-magnetic substrate;
(b) a layer stack on the substrate, the layer stack including at least one magnetic layer; and
(c) a protective overcoat layer comprising pores and/or channels extending therethrough, the pores and/or channels filled with a hydrophobic material for preventing contact of the at least one magnetic layer with water and/or water vapor.

Preferred embodiments of the present invention include those wherein the protective overcoat layer is carbon (C)-based and is an ultra-thin layer having a thickness from about 10 to about 25 Å; the pores and/or channels of the protective overcoat layer (c) are filled with a low molecular weight perfluoropolyether compound; and the medium further comprises a lubricant topcoat layer (d) on the protective overcoat layer, wherein the lubricant topcoat layer (d) comprises a perfluoropolyether compound and is from about 10 to about 16 Å thick.

Yet another aspect of the present invention is a thin film data/information storage retrieval medium, comprising:

(a) a layer stack comprising at least one magnetic layer and an ultra-thin protective overcoat layer atop the at least one magnetic layer, comprising pores and/or channels extending therethrough; and (b) hydrophobic means filling the pores and/or channels of the protective overcoat layer for preventing contact of the at least one magnetic layer with water and/or water vapor.

Additional aspects and advantages of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the features are not necessarily drawn to scale but rather are drawn as to best illustrate the pertinent features, wherein.

DESCRIPTION OF THE INVENTION

The present invention addresses and solves problems attendant upon the formation of ultra-thin protective overcoat layers on thin film magnetic and/or MO recording media, particularly when the ultra-thin protective overcoat layers are discontinuous and include pores and/or channels extending through their thickness to expose underlying magnetic layer(s), and is based upon recognition by the inventors that a key factor determining the corrosion properties/characteristics of thin film recording media comprising at least one magnetic layer covered by a protective overcoat layer, is the presence of moisture, e.g., water and/or water vapor, in the pores and/or channels extending through the thickness of the overlying protective overcoat layer, whereby contact between the water and/or water vapor and the underlying magnetic layer(s) is facilitated, disadvantageously resulting in corrosion of the media.

Specifically, the present invention is based upon the discovery by the present inventors that such moisture-induced corrosion can be eliminated, or at least substantially minimized, by means of a readily effectuated process comprising performing an initial step of driving off the moisture, e.g., water and/or water vapor, from the pores and/or channels in the protective overcoat layer, as by baking the media with protective overcoat thereon at an elevated temperature while in a reduced pressure environment, followed by performing a step of vapor depositing for filling (or "plugging") the pores and/or channels of the protective overcoat with small-sized hydrophobic molecules, e.g., perfluoropolyether lubricant molecules with low molecular weights (Me) from about 500 to about 1,000, thereby effectively limiting ingress of moisture into the pores and/or channels and increasing/enhancing corrosion resistance of the media. According to the inventive methodology, the thus-formed media comprising protective overcoat layers with pores and/or channels filled (or "plugged") with hydrophobic molecules, are subjected to further processing for forming lubricant topcoat layers over the filled (or "plugged) protective overcoat layers, e.g., by dipping the media in a solution of a lubricant topcoat material, typically a perfluoropolyether compound. Thin film media formed according to the inventive methodology advantageously exhibit no or substantially reduced corrosion at protective overcoat layer thicknesses of about 15 Å and below.

Figure 1:
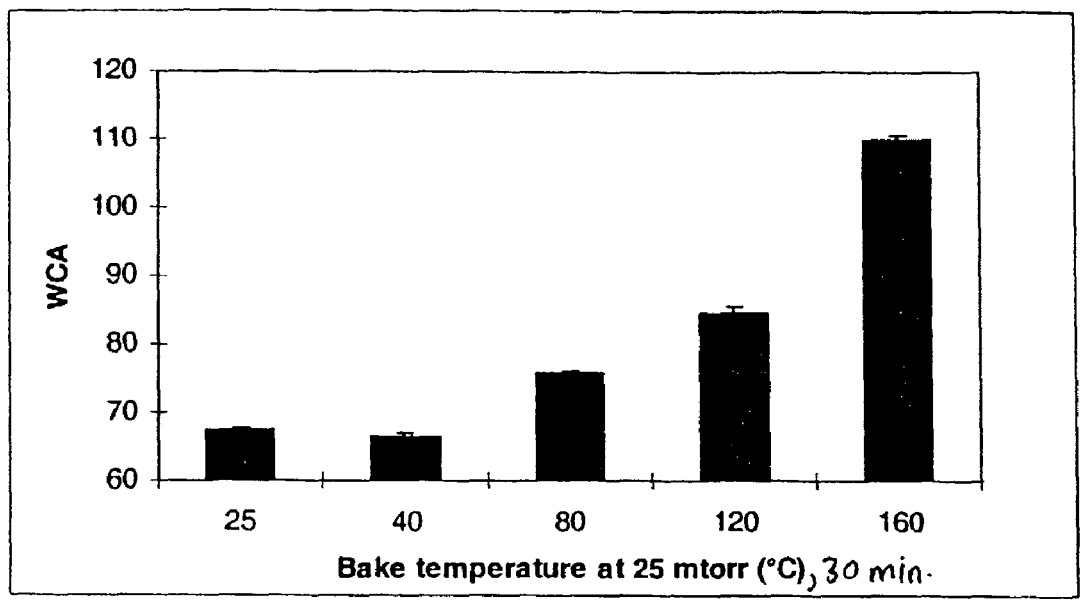
FIG. 1 is a graph for illustrating variation of the water contact angle (WCA) of magnetic media with baking temperature during the moisture removal/vapor lubrication process.

Referring to FIG. 1, presented therein is a graph showing an illustrative, but not limitative, example of the variation of the water contact angle (WCA) of magnetic media with baking temperature during a moisture removal/vapor lubrication process, wherein magnetic media with carbon (C)-based protective overcoat layers of 15 Å or less thickness are baked at temperatures from about 25 to about 160° C. for about 30 min. in a reduced pressure atmosphere of about 25 mTorr and, at the end of the baking interval, exposed to vapors of a relatively small-sized hydrophobic molecule, i.e., a perfluoropolyether of low molecular weight ($M_n$) from about 500 to about 1,000 for absorption onto the C-containing overcoat layer for filling ("plugging") of the pores and/or channels therein. As is evident from FIG. 1, removal of moisture, e.g., water and/or water vapor, from the media, as by heating at a temperature of at least about 60° C. for about 30 min. in a reduced pressure environment, followed immediately by exposure to vapors of a low molecular weight hydrophobic perfluoropolyether, resulted in a significant increase in the WCA, hence a decrease in surface energy beneficial for tribological performance of the media.

According to the invention, the thus baked+vapor-treated media is then dip-lubed at ambient temperature in a lubricant-containing solution, typically a perfluoropolyether compound or derivative. The inventive process results in formation of extremely hydrophobic surfaces, particularly in the areas of the pores and/or channels, such that moisture in the form of water and/or water vapor is effectively prevented from entering and diffusing through the pores and/or channels of the protective overcoat layer to contact the underlying magnetic layer(s). As a consequence, the corrosion resistance of the magnetic media is significantly improved, as described below with reference to FIG. 2.

Figure 2:
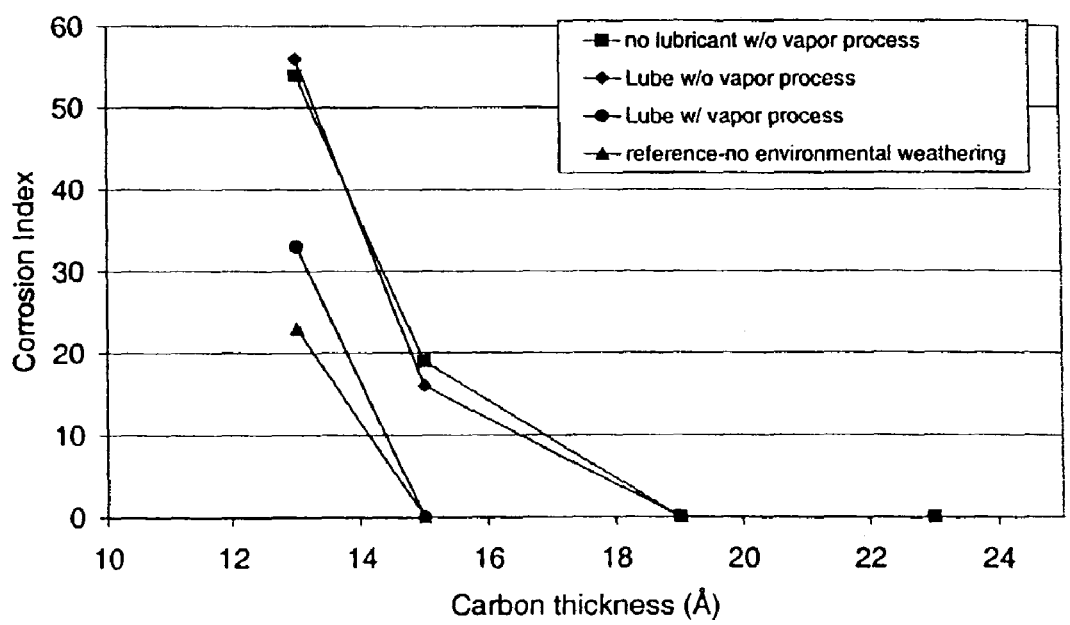
FIG. 2 is a graph for illustrating the variation of corrosion index on thickness of a carbon (C)-based protective overcoat layer for several differently processed magnetic media.

Adverting to FIG. 2, shown therein is a graph for illustrating the variation of corrosion index on the thickness of carbon (C)-based protective overcoat layers of several differently processed magnetic media. As is evident from the figure, magnetic media which received neither the inventive baking/vapor deposition process (for filling pores in the overcoat layer) or a lubricant topcoat layer (dark squares) exhibited a very high corrosion index (i.e., ca. 55) when the thickness of the ultra-thin carbon (C)-based protective overcoat layer was about 13 Å, which corrosion index was reduced to about 20 when the thickness of the ultra-thin carbon (C)-based protective overcoat layer was increased to about 15 Å. However, a protective layer thickness of about 19 Å is seen as necessary for complete prevention of corrosion. Similar behavior was observed with media which did not receive the inventive baking/vapor deposition process (for filling pores in the overcoat layer) but did receive a dip-coated lubricant topcoat layer (dark diamonds). The similarity in corrosion resistance between the untreated media without a lubricant topcoat layer and untreated media with a lubricant topcoat layer clearly indicates that conventional dip coating of a lubricant topcoat layer without performing the inventive baking/vapor lubrication process is insufficient to remove water and/or water vapor from pores and/or channels in the protective overcoat layer.

By contrast, media subjected to the inventive baking/vapor deposition process comprising: (1) expelling moisture from the pores/and or channels in the overcoat layer in a baking step performed under reduced pressure, and (2) filling the pores and/or channels in the overcoat layer with hydrophobic material in a vapor process, followed by application of a lubricant topcoat layer in conventional manner (dark circles), exhibited significantly reduced corrosion (vis-à-vis the media which did not receive the inventive baking/vapor lubrication process) at an overcoat layer thickness of about 13 Å, and substantially no corrosion at an overcoat layer thickness of about 15 Å. (The "reference" line in FIG. 2 indicates a situation wherein, when the carbon layer thickness is too thin, e.g., <15 Å, such that corrosion of the media begins in the ambient atmosphere immediately after removal from the sputtering chamber, prior to application of the lubricant topcoat. Such corrosion can be avoided by maintaining the media under a nitrogen gas environment prior to applying the inventive process thereto).

The above-described experimentally obtained results clearly demonstrate the advantage(s) provided by the present invention, i.e., formation of media exhibiting reduced or substantially no corrosion, with extremely thin protective overcoat layers. Specifically, according to the invention, substantially no corrosion is observed at a protective overcoat layer thickness of about 15 Å, whereas a thickness of about 19 Å is required to achieve substantially no corrosion of media fabricated according to conventional processing methodology. The reduction in protective overcoat layer thickness provided by the inventive methodology facilitates manufacture of media/disk drive systems with increased areal recording densities arising from the reduction in flying heights of read-write transducer heads afforded by the invention. Moreover, the inventive methodology can be readily practiced in cost-effective manner and is fully compatible with all aspects of automated manufacturing techniques for magnetic and MO recording media.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method for increasing the corrosion resistance of a data/information storage and retrieval medium, comprising sequential steps of:
    (a) providing a thin film data/information storage retrieval medium comprising, in overlying sequence:
        (i) a non-magnetic substrate;
        (ii) a layer stack including at least one magnetic layer; and
        (iii) a protective overcoat layer comprising a plurality of pores and/or channels extending therethrough;
    (b) maintaining said medium at an elevated temperature in a reduced pressure environment for an interval sufficient to remove moisture contained in said pores and/or channels of said protective overcoat layer; and
    (c) filling said pores and/or channels of said protective overcoat layer with a hydrophobic material.

2. The method as in claim 1, wherein:
    step (b) comprises heating said medium at a temperature and for an interval sufficient to remove water and/or water vapor from said pores and/or channels.

3. The method as in claim 1, wherein:
    step (c) comprises exposing said protective overcoat layer to a vapor of said hydrophobic material.

4. The method as in claim 1, further comprising a step of:
    (d) applying a lubricant topcoat layer over said protective overcoat layer.

5. The method as in claim 4, wherein:
    step (d) comprises applying said lubricant topcoat layer by means of a dipping process.

6. The method as in claim 1, wherein:
    step (a) comprises providing a thin film data/information storage medium with an ultra-thin protective overcoat layer (iii) having a thickness from about 10 to about 25 Å.

7. The method as in claim 6, wherein:
    step (a) comprises providing a thin film data/information storage medium wherein said ultra-thin protective overcoat layer (iii) is carbon (C)-based.

8. The method as in claim 7, wherein:
    step (b) comprises heating said medium in an about 25 mTorr environment for about 30 min. at a temperature from about 60 to about 160° C. to remove water and/or water vapor from said pores or channels.

9. The method as in claim 8, wherein:
    step (c) comprises exposing said protective overcoat layer to a vapor of a lubricant material.

10. The method as in claim 9, wherein:
    step (c) comprises exposing said protective overcoat layer to a vapor of a low molecular weight perfluoropolyether compound.

11. The method as in claim 10, further comprising a step of:
    (d) applying a lubricant topcoat layer over said protective overcoat layer.

12. The method as in claim 11, wherein:
    step (d) comprises dipping said medium in a liquid solution comprising a perfluoropolyether compound.

* * * * *